(12) United States Patent
Klemenz et al.

(10) Patent No.: US 9,600,299 B2
(45) Date of Patent: Mar. 21, 2017

(54) APPLICATION OBJECT FRAMEWORK

(71) Applicants: Oliver Klemenz, Hoffenheim (DE); Ulrich Bestfleisch, Schwetzingen (DE)

(72) Inventors: Oliver Klemenz, Hoffenheim (DE); Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/689,920

(22) Filed: Apr. 17, 2015

(65) Prior Publication Data

US 2016/0306637 A1 Oct. 20, 2016

(51) Int. Cl.
*G06F 9/46* (2006.01)
*G06F 9/44* (2006.01)

(52) U.S. Cl.
CPC .................. *G06F 9/4443* (2013.01)

(58) Field of Classification Search
CPC ................. G06F 9/4435; G06F 9/4443; G06F 17/30595; G06F 17/30607
USPC .................................. 717/101–113; 718/100
See application file for complete search history.

(56) References Cited

U.S. PATENT DOCUMENTS

| | | | |
|---|---|---|---|
| 6,973,460 B1 * | 12/2005 | Mitra | G06F 8/10 |
| 7,516,141 B2 * | 4/2009 | Ruan | G06F 8/24 |
| 7,757,210 B1 * | 7/2010 | Krueger | G06F 8/24 715/757 |
| 8,887,132 B1 * | 11/2014 | Hunter | G06F 9/44505 717/111 |
| 8,954,927 B2 * | 2/2015 | Polly | G06Q 10/10 717/106 |
| 2004/0187140 A1 * | 9/2004 | Aigner | G06F 8/20 719/328 |
| 2005/0108684 A1 * | 5/2005 | Sohn | G06F 8/20 717/120 |

OTHER PUBLICATIONS

Rockford Lhotka, "Expert C# 2008 Business Objects", 2009, Apress, Chapters 1-4, 8-10, pp. 1- 171, 263-330.*

* cited by examiner

*Primary Examiner* — Ted T Vo
(74) *Attorney, Agent, or Firm* — Mintz Levin Cohn Ferris Glovsky and Popeo, P.C.

(57) ABSTRACT

A system, a method, and a computer program product for providing an application object framework are disclosed. In response to a request, an application object of a software application is obtained from an application object framework. The application object framework loads a metadata corresponding to the requested application object. The metadata contains at least one metadata schema definition. The application object framework generates a runtime interface for execution of the requested application object based on the loaded metadata.

20 Claims, 8 Drawing Sheets

APPLICATION OBJECT FRAMEWORK

TECHNICAL FIELD

This disclosure relates generally to data processing and, in particular, to in-memory database processing using application object framework.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, etc. that may manipulate data in different ways to achieve results desired by the user.

Users can design and/or create various business process objects, such as sales orders, invoices, etc. A business object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany. Each created object comes with a particular view that is specific to the system where it is created and/or stored. However, conventional systems do not provide an efficient way of maintaining and/or storing business data. This can lead to increased operational and/or maintenance costs as well as decreased effectiveness of business systems.

SUMMARY

In some implementations, the current subject matter relates to a computer-implemented method for providing an application object framework. The method can include obtaining, in response to a request, an application object of a software application from an application object framework, loading, by the application object framework, a metadata corresponding to the requested application object, the metadata containing at least one metadata schema definition, and generating, by the application object framework, a runtime interface for execution of the requested application object based on the loaded metadata. At least one of the obtaining, the loading, and the generating can be performed by at least one processor of at least one computing system.

In some implementations, the current subject matter can include one or more of the following optional features. The application object can include at least one persistent application object and at least one operation. The operations can include at least one of the following: a create operation, a read operation, an update operation, a delete operation, a custom action operation, an existence of action check operation, and an operation on at least one property of the requested application object.

In some implementations, the method 800 can store results of the execution of the requested application object in a database communicatively coupled to the application object framework. The database can store an updated metadata for the requested application object based on the execution of the requested application object.

In some implementations, the requested application object can be characterized by at least one of the following: an object definition, a definition of an application object node, a definition of an application object root node, a definition of an application object node attribute, a definition of an application object action, and a definition of an application object authorization. The requested application object can be also characterized by at least one static property and at least one dynamic property. The request application object can further include at least one extension providing extensibility to the software application.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to an application object framework for maintaining and storing various data, including business objects, business processes, business process applications, and/or any other data. The application object framework can be operable using High Performance Analytic Appliance ("HANA") system as developed by SAP SE, Walldorf, Germany. In some implementations, the current subject matter relates to a generic application object framework that can provide access to create, read, update and delete ("CRUD") operations and associated business processes. The application object framework ("AOF") can be a framework that can be based on the HANA platform using an extended services ("XS") engine. The framework can be coded using a server-side language Javascript.

In some implementations, the application object framework can be used to provide transactional business applications and easy-to-use possibility to modify business data on database tables. The AOF can provide for enhanced development efficiency, where a simple application object including basic CRUD functionality can be quickly enabled. The AOF can also provide for an enhanced supportability, testability, and extensibility. Using the application object framework, extensibility features can be easily introduced. The application object framework can support an extensible metadata declaration to provide extensibility.

Figure 1:
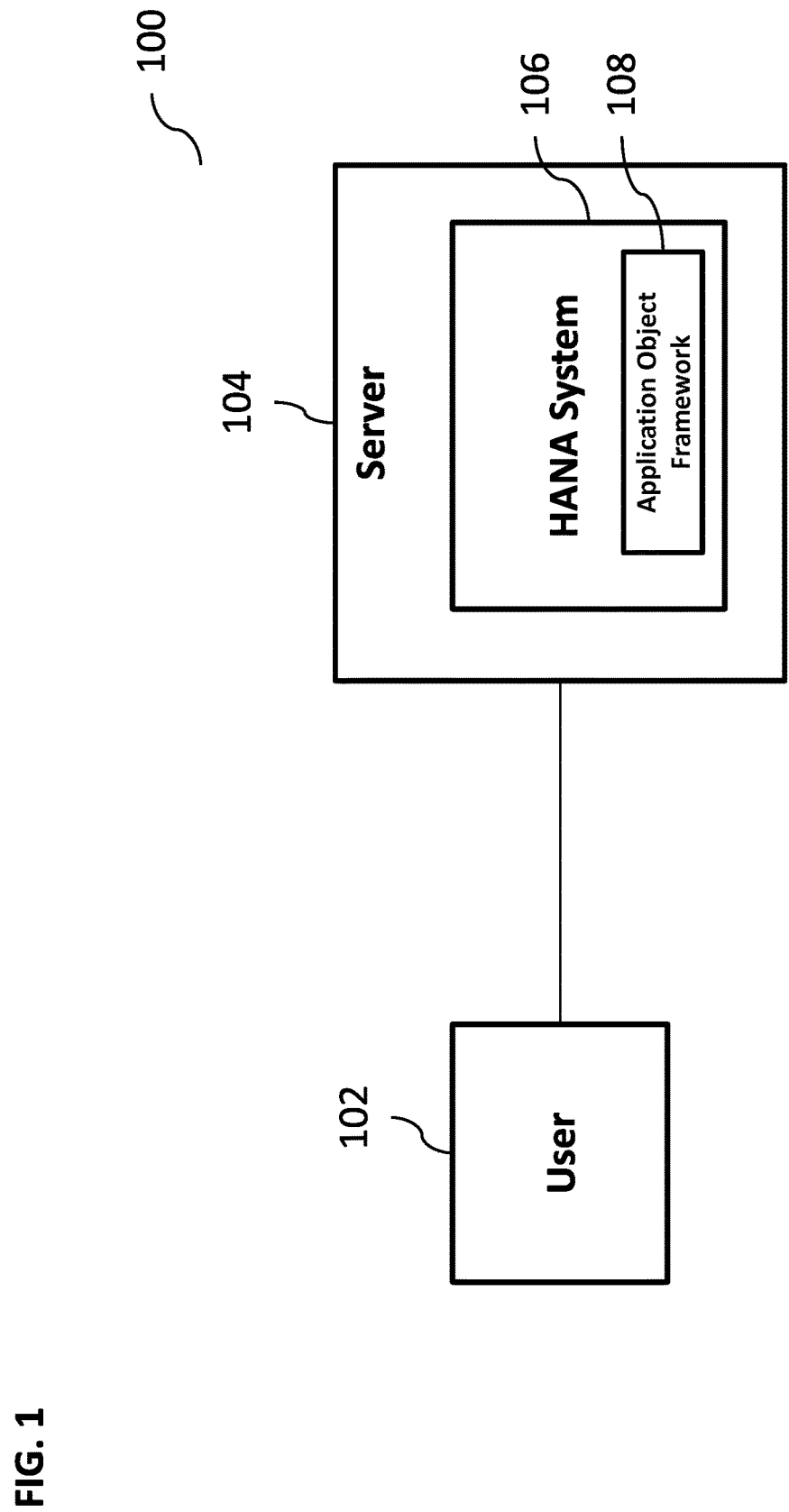
FIG. 1 illustrates an exemplary system that can implement an application object framework, according to some implementations of the current subject matter.

FIG. 1 illustrates an exemplary system 100 that can implement an application object framework, according to some implementations of the current subject matter. The system 100 can include a user 102 communicating with a server 104. The server 104 can include hardware, software, and/or any combination thereof that can support operation of a high performance analytic appliance system 106, which can also include an application object framework 108. The user 102 can be a local client user, a remote user, an application, a business object, a business process, a business process application, and/or any other user.

Figure 2:
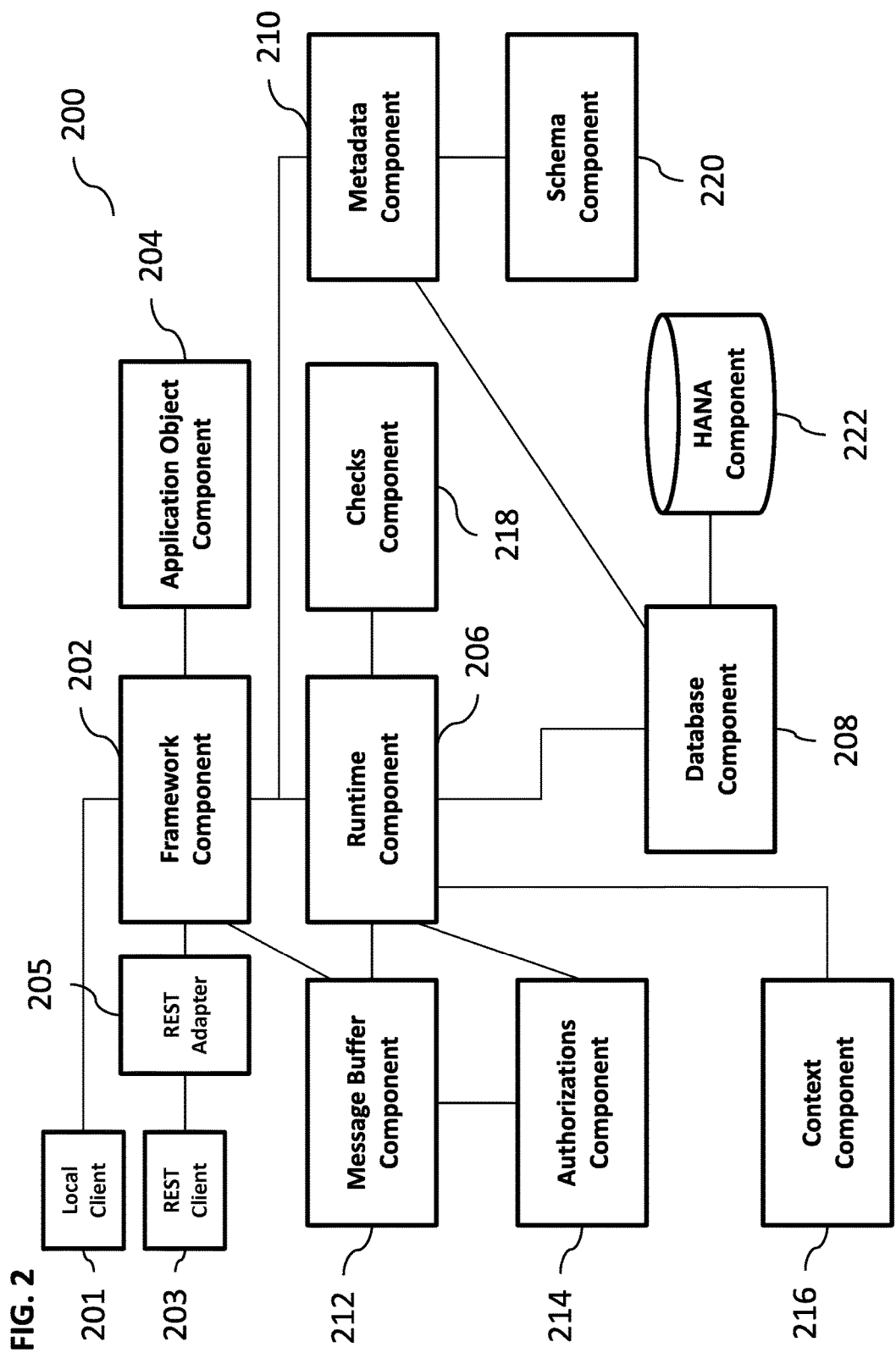
FIG. 2 illustrates exemplary application object framework architecture, according to some implementations of the current subject matter.

FIG. 2 illustrates exemplary application object framework architecture 200, according to some implementations of the current subject matter. The AOF framework 200 can include a framework component 202, an application object component 204, a runtime component 206, a database component 208, a metadata component 210, a message buffer component 212, an authorizations component 214, a context component 216, a checks component 218, a schema component 220, and a HANA component 222. The architecture 200 can be accessed by a local client 201 and a representational state transfer ("REST") client 203 via an adapter 205. The local client 201 can access the framework component 202 of the system 200 directly. The local client 201 can be a business object, a business process, an application, a user and/or any other client. The REST client 203 can access the framework component 202 via the adapter 205 and using any available protocols, such as a hypertext transfer protocol ("HTTP"). The REST client 203 can be a business object, a business process, an application, a user and/or any other client. In some implementations, the differences between clients 201 and 203 can be in the way how the clients access the system 200 and in particular the framework component 202.

The framework component 202 can be a central point of entry into the system 200 and can provide a buffered application object interface for an application object name, allowing access to runtime component 206. Once the client (client 201 and/or 203) has accessed the framework component 202, the framework component 202 can request the application object component 204 to load a library corresponding to the requested application object, including its definition, structure, attributes, actions, checks, determinations, etc. The framework component 202 can also request the metadata component 210 to load a corresponding metadata that can be associated with the requested application object. The metadata component 210 can also obtain an appropriate metadata schema from the schema component 220, which can provide information about metadata definitions associated with the requested application object. The framework component 202 can also obtain information about transaction(s) that can use the requested application object. In response to the access by the client, the framework component 202 can return a runtime access interface to the client (client 201 and/or client 203), which can include metadata definition(s).

In some implementations, a runtime interface can be provided by the runtime component 206. The runtime component 206 can execute various application object operations, which can include create, read, update, and/or delete operations ("CRUD") as well as any other methods and/or custom actions. During creation of the runtime interface, application object definition(s) can be loaded from a library file, which can be obtained from the application object component 204. The application object definition(s) can be obtained based on the application object name, which can contain a package name (corresponding to a software package that can contain the requested application object) and/or an object name (corresponding to the requested application object). The runtime component 206 can also request the checks component 218 to perform various checks on the information obtained about the requested application object. The checks component 218 can perform checks of attribute(s), foreign key(s), etc. associated with the requested application object to determine whether or not such attribute(s), foreign key(s), etc. are valid. If the attribute(s), foreign key(s), etc. are not valid, an appropriate error message can be generated and returned to the client. The error message can be stored in the message buffer component 212.

Additionally, the runtime component 206 and the framework component 202 can access the message buffer component 212 to add message(s) and/or obtain message(s) associated with the requested application object. The operation of the message buffer component 212 is discussed in further detail below.

In some implementations, during generation of a runtime interface for the client, the runtime component 206 can request the authorizations component 214 to perform one or more authorizations associated with the requested application object. The authorizations can include at least one of the following: checking instance access for the application object, checking parent instance access of a parent object of the application object (in some implementations, the objects can be stored in a hierarchical and/or tree like structure in a memory location). The authorization component 214 can also perform various other checks on the requested application object.

The runtime component 206 can also access the context component 216 to obtain various context that can be associated with the requested application object. The context can include at least one of the following: user information, action(s) associated with the requested application object, timestamp(s) that may be requested when the application was accessed, modified, etc., as well any other information. In some implementations, the context component 216 can also provide at least one of the following: current context, such as a database-connection, current application user, current operation and/or request timestamp. The application object framework can be exposed as REST protocol using the REST adapter 205.

In some implementations, the runtime object 206 can also provide information for storage in the HANA component 222 via the database component 208. An exemplary HANA component is discussed below in connection with FIGS. 5-6. The database component 208 can store various updates that may have been performed by the runtime component 206 as a result of the CRUD operations and/or any other custom operations. The database component 208 can also update metadata definitions (e.g., table metadata tables) associated with the requested application object as well as perform various other operations.

In some implementations, once a metadata definition for the requested application object is loaded from the metadata component 210, the framework component 202 can return a runtime access interface to the client, including the metadata definition provided by the metadata component 210. Application object operations in the runtime component 206 can be executed according to the exemplary sequence discussed below.

Figure 4:
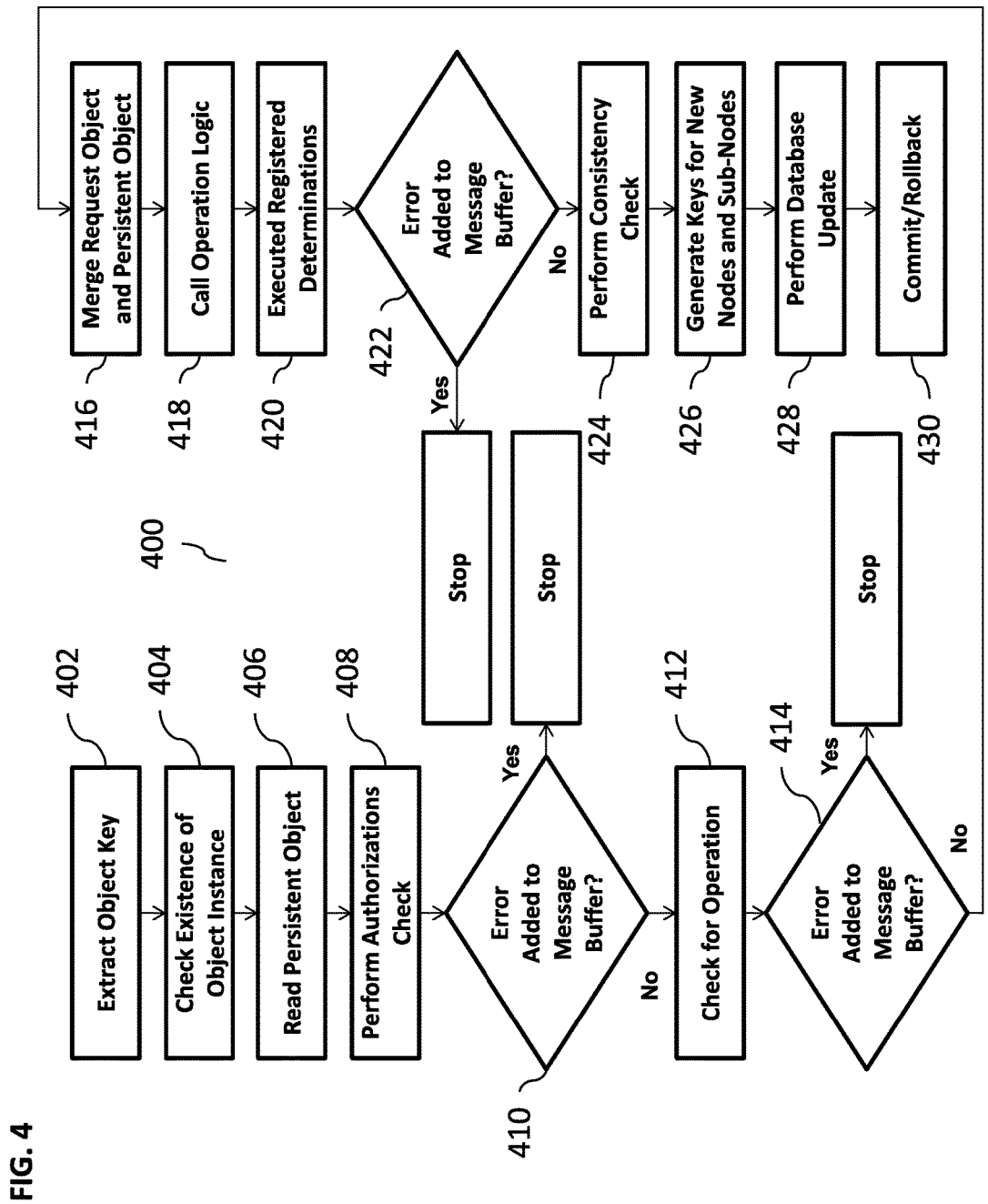
FIG. 4 illustrates an exemplary sequence executed by a runtime component, according to some implementations of the current subject matter.

FIG. 4 illustrates an exemplary sequence 400 executed by the runtime component 206, according to some implementations of the current subject matter. At 402, an object key can be extracted by the runtime component 206 and existence of an object instance by key can be checked, at 404. The runtime component 206 can then read, at 406, a persistent object by key and transform relational table data representation to a Javascript object representation. The runtime component 206 can then call the authorizations component 214 to perform an authorization check of the object key, at 408. This check can be instance based. The call can be interrupted if there is an error message that has been added to the message buffer component 212, at 410. Otherwise, the runtime component 206 can then call the check component 218 for operation associated with the object, at 412. Similarly, the call can be interrupted if there is an error message that has been added to the message buffer component 212, at 414. Otherwise, the object operation and the persistent object can be merged together using a primary key, at 416. The merger can be based on the read only information and/or constant values and any used handle keys can be registered to initialize a getNextHandle function.

The runtime component 206 can then call an operation logic (e.g., execute any of the CRUD operations and/or any custom actions) that can be performed on the requested application object, at 418. The operations can be performed based on the metadata definitions that can be supplied by the metadata component 210, at 420. If an error message has been added to the message buffer component 212, the execution of the operation logic can be stopped, at 422. Otherwise, after execution of the operation logic, the checks component 218 can be called to determine consistency of the performed operations for all nodes and/or attributes associated with the application object based on the metadata definitions provided by the metadata component 210, at 424. Keys can be generated for any newly created nodes and/or sub-nodes as a result of the execution of the operation logic, at 426. The runtime component 206 can call on the database component 208 to perform updates to the data associated with the application object as a result of the execution operation logic, at 428. The updates can be provided to the HANA component 222. The database component 208 can transform Javascript object representation to relational table modifications representation. The operations performed by the runtime component 206 on the requested application can be committed, or rolled back if an error message exists in the message buffer component 212, at 430.

Referring back to FIG. 2, in some implementations, the metadata definitions of an application object can be validated using the schema component 220 by the framework component 202 and can be performed on demand. In some implementations, to improve performance of the system 200, the schema check might not be performed each time the runtime interface for an application object is instantiated.

In some implementations, the requested application object can be loaded based on a particular definition. This definition can be stored in a separate library that can be addressed using the name of the requested application object. The application object name can be split up into application package name and an object name. In some implementations, the library can be loaded using the following code:

var oLibrary=$.import(sPackageName, sObjectName);

In some implementations, the library can include a single definition property at the object definition (this.definition), and can further specify the metadata definition for the requested application object. An exemplary definition (salesorder.xsjslib) can contain the following code:

```
this.definition = {
    actions : {
        create : {
            checkAuth : false,
            historyEvent : "SALES_ORDER_CREATED"
        },
        update : {
            checkAuth : auth.instanceAccessCheck("sap.sd.db.order::v_auth_sales_order_update",
"SALES_ORDER_ID",Message.AUTH_MISSING_SALES_ORDER_UPDATE),
            historyEvent : "SALES_ORDER_UPDATED"
        },
        del : {
            checkAuth : auth.instanceAccessCheck("sap.sd.db.order::v_auth_sales_order_update",
"SALES_ORDER_ID", Message.AUTH_MISSING_SALES_ORDER_DELETE),
            historyEvent : "SALES_ORDER_DELETED"
        },
```

```
            read : {
                checkAuth : false
            }
        },
        Root : {
            table : "sap.sd.db.order::t_order_header",
            historyTable : "sap.sd.db.order::t_order_header_h",
            sequence : " sap.sd.db.order::s_order_header",
            determinations : {
                onCreate : [createOwner],
                onModify : [determine.systemAdminData]
            },
            nodes : {
                Items : {
                    table: "sap.sd.db.order::t_order_item",
            historyTable : "sap.sd.db.order::t_order_item_h",
            sequence : "sap.sd.db.order::s_order_item",
            sequence: "SALES_ORDER_ID"
            attributes : {
                PRODUCT_ID : {
                    foreignKeyTo : "sap.sd.xs.md.Product"
                }
}
            }
    },
        attributes : {
            SALES_ORDER_ID : {
                readOnly : true
},
            CREATED_AT : {
                readOnly : true
            },
            CREATED_BY : {
                readOnly : true
            },
            CHANGED_AT : {
                readOnly : true
            },
            CHANGED_BY : {
                readOnly : true
            }
        }
    }
}
```

Figure 3:
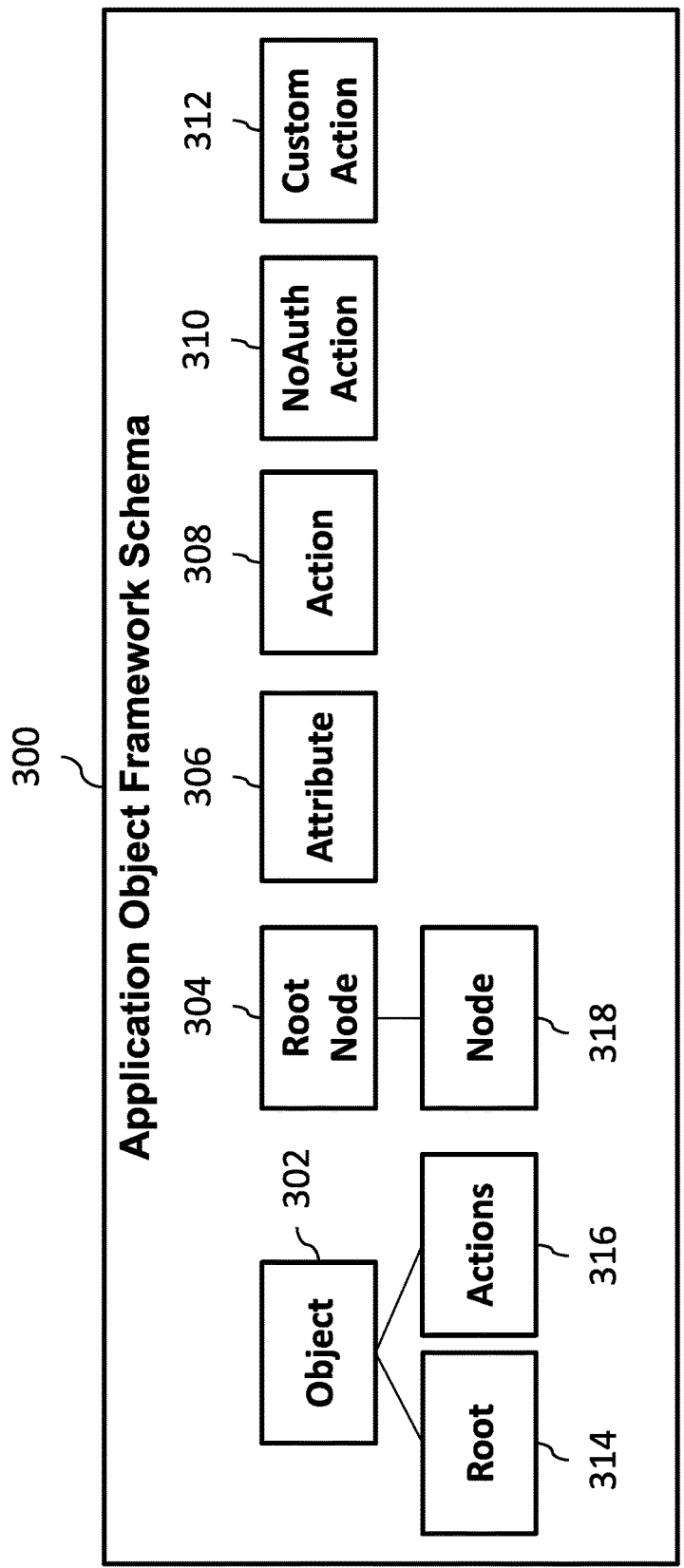
FIG. 3 illustrates an exemplary schema that can be used for the requested application object's definition, according to some implementations of the current subject matter.

In some implementations, the requested application object's definition can follow a particular application object framework schema. FIG. 3 illustrates an exemplary schema 300 that can be used for the requested application object's definition, according to some implementations of the current subject matter. The schema 300 can include an object level 302, a root node level 304, an attribute level 306, an action level 308, a non-authorized action level 310, and a custom action level 312. The schema 300 can implement at least one of the following Javascript types (having the indicated values): Structure: "Javascript Object" value, Array: "Javascript Array" value, Function: "Javascript Function" value, String: "String" value, Boolean: "Boolean" value, Number: "Number" value, False: "Boolean and False" value, and Null: "Null" value.

The object level 302 can be a top level of the application object definition. It can include a type, which can be a structure corresponding to a Javascript object, and a definition. The definition can include a root 314 and actions 316.

The root 304 can contain definition of the application object root. It can include a true value (which might be a required property in the definition) and a type of a RootNode, which can be a definition check that is performed against schema RootNode. The actions 316 can define application object actions (which might be a required property in the actions 316). The Javascript type of the actions can be Structure (i.e., Javascript Object). The actions 316 can include constraints, which can define various listed constraints (including their listed properties) and how they can be implemented. The constraints can be required, optional, forbidden, and/or generic.

The required constraints can include various actions. Exemplary actions can include at least one of the following: "create" (e.g., create operation of the application object, having a Javascript type: Action (performing a definition check against schema Action)), "update" (e.g., update operation of the application object), "delete" (e.g., delete operation of the application object), "read" (e.g., read operation of the application object), etc.

The optional constraints can include listed properties that can be allowed but that can be optional. Further, some constraints can be forbidden, i.e., listed properties that might not be allowed (e.g., a keyword is protected). Additionally, constraints can also be generic, whereby generic property definitions can be allowed and defined by an unknown name. These properties can perform a definition check against a particular customer action schema.

In some implementations, the schema 300 can include nodes (e.g., node 318), which can define an application object node. The nodes can be part of a structure of the scheme 300. The node can include at least one of the following: a table, a sequence, a history table, a parent key, read only property, a check, an attribute, and any other type of node property. The table can specify a persistence table for the application object node and have a type of a string (i.e., a definition check can be performed against string). The sequence can specify a sequence for the application object node. The history table can specify a persistence history table for the application object node. The parent key can specify a parent key table field for sub-nodes. The read only property can specify if a node (including attributes) is modifiable externally. The read-only property can be a Boolean parameter, a function, and/or a null value. The check property can refer to consistency checks that can be performed on a node after a modification. The check property can be an array function. The attribute can specify attribute properties merged with metadata derived from the table definition. Other node properties can specify sub-nodes of the current node.

In some implementations, the schema 300 can include a root node (e.g., root node 304), which can provide a definition of an application object root node. The root node definition can include a determinations property. The determinations property can specify determinations executed after application object modifications. The determinations property can include various constraints, which can be at least one of the following: an on-create constraint, an on-update constraint, and an on-modify constraint. These constraints can be array functions. The on-create constraint can specify determinations executed after application object creation. The on-update constraint can specify determinations executed after application object update. The on-modify constraint can specify determinations executed after application object creation or update.

In some implementations, the schema 300 can include an attribute 306 component, which can be a definition of an application object node attribute. The attributes can include at least one of the following: a required attribute (i.e., specifying that the attribute is mandatory), a foreign key attribute (i.e., specifying the application object name, the attribute value is a foreign key), a constant key attribute (i.e., specifying that a constant key the attribute is a default with and which is used during read for selection), a read only attribute (i.e., specifying that the attribute is read only and not modifiable externally), and a checks attribute (i.e., specifying consistency checks on attribute after modifications).

In some implementations, the schema 300 can include an action component 308, which can define an application object action. The action 308 can include at least one of the following: a check authorization action (i.e., specifying an authorization check for the action), a check enabled action (i.e., specifying an enabled check for the action), and a history event action (i.e., specifying a history event name for the history table entry).

In some implementations, the schema 300 can include a no-authorization action component 310, which can define an application object action with no authorization check. This component can include a check authorization action, which can indicate that check authorization is not allowed.

In some implementations, the schema 300 can include a custom action 312 component, which can define an application object action with no authorization check. The action 312 can include execute action that can specify an execution logic of the custom action.

In some implementations, the schema 300 can include a metadata definition from the XS engine library file for the application logic that can be read (as shown above this.definition) and interpreted. A majority of metadata information can automatically be derived from the underlying database tables specified an object node definition. The following is an exemplary code indicative of the how the metadata information can be derived:

```
{
    COLUMN_NAME : 'ID',
    DATA_TYPE_NAME : 'INTEGER',
    IS_NULLABLE : 'FALSE',
    SCALE : 0,
    IS_PRIMARY_KEY: 'TRUE'
}, {
    COLUMN_NAME : 'NAME',
    DATA_TYPE_NAME : 'NVARCHAR',
    IS_NULLABLE : 'TRUE',
    LENGTH : 200,
    SCALE : null,
    IS_PRIMARY_KEY : 'FALSE'
}
```

In some implementations, all attributes defined in the table for a node definition can be automatically defined according to the table specification. The column name can correspond to an attribute name. Additionally, the attribute type, the length, scale and/or if it is mandatory attribute can be derived. The node primary key can be derived from this information as well. In some implementations, the application object definition in the library file can only maintain the additional metadata that cannot be derived from the database tables. Both metadata information are merged at runtime and provided as metadata access to the runtime module.

In some implementations, local client access to the application object framework can be provided using an application programming interface ("API"), such as a Javascript API. The following exemplary, non-limiting code can be used to provide access:

```
var aof = $.import("sap.ino.xs.aof.core", "framework");
var objectFacade = aof.getApplicationObject
    ("<application_object_package>.<object_name>")
```

For local client access, the application object framework library can be imported using $.import command, including the application object name. An object interface can be returned using the factory method getApplicationObject. The object interface can expose CRUD services and various business actions, which can include at least one of the following: create, update, delete, exists, read, custom actions, properties, static properties, and/or other services. The create service can create an application object instance (including any of its sub-structures), e.g., a root node, a sub-node item (for each attribute). The update service can update an application instance (including any of its sub-structures) using a root key. The delete service can delete an application object instance (including any sub-nodes). The exists service can check existence of an application object instance using a key. The read service can read an application object instance for a key and can return a null if no object is found. The custom actions service can call a custom action on application object instance (including any sub-structures) using a key and action parameters received from an execution call. The properties services can retrieve dynamic properties of an application object instance for actions, nodes, and/or attributes. The static properties services can retrieve static properties for an existing application object instance for actions, nodes and/or attributes.

In some implementations, updates to application object instances can be performed on at least one of the following rules. At an attribute level, if an attribute property is not provided in the object structure, the persisted value is not overwritten. If an attribute property is provided in the object structure, the new value overwrites the persisted value. At the node level, if a node property is not provided in the object structure, all instances of the node are not overwritten. If a node property is provided in the object structure, the following merge logic can be applied (equality of two node instances can be determined using the defined node key): node instances provided and already existing are updated, node instances provided and not already existing are created, and node instances not provided and already existing are deleted.

In some implementations, messages in the application object framework can be characterized by at least one of the following: severity (e.g., information, warning, error (stops processing at specific processing steps), fatal (immediately stops processing)), message key identifying a text key in a text bundle, a primary reference key of a message reference node, a reference node in the application object instance, a reference attribute in the reference node of the application object instance, and message parameters. During processing of the object interface call, messages can be issued with regard to at least one of the following processing functions: check authorization, check enabled, action execute, determination, check consistency, check read only, and/or any other functions. The check authorization function can be called for create, update, delete, read and custom actions services, for which an authorization can be checked for a passed object instance. The check enabled function can be called for create, update, and custom actions services, for which a check can be called before execution for a passed object instance. The action execute function can be called for custom actions services, for which a check can be called before execution for a passed object instance. The determination function can be applicable to only a root node and can be called for create, update, and custom actions services, for which a check is performed before execution for a passed object instance. The check consistency function can be called for create, update, and custom actions services, for which consistency checks can be called after execution for a passed object instance (including any sub-structures and/or attributes). The check read only function can be called for create, update, and custom actions services, for which a read only check of a node and/or attributes can be called during a merge of a request and a persisted object. A context object that can be passed in as parameters can include at least one of the following functionalities: get access to a current query instance for database access, retrieve current application user, get current called action, get current request timestamp.

In some implementations, by exposing an application object and its services as REST operations, various properties, including static properties, of the object can be obtained. A key of an application object instance can be extracted from uniform resource locator ("URL") parameters of the object, if such parameters exist. Otherwise, the key can be derived from the root node of the REST body structure (e.g., JSON structure). Generated keys and messages can be mapped to the REST return structure. Any errors can be placed in the message buffer component 212. Additionally, REST calls can be wrapped with a trace wrapper, which can allow returning of traces by including a $trace statement as part of the request URL. To expose an application object via REST, a XSJS file can be created, which can include the following exemplary, non-limiting code:

```
var RESTAdapter = $.import("sap.ino.xs.aof.rest", "adapter");
RESTAdapter.expose("sap.ino.xs.idea.Comment");
```

As shown by the code above, initially, a generic REST adapter library can be imported and can provided using a function "expose", which can handle the above REST mapping, request and a response by specifying the application object name as a parameter. Thus, an application object can be accessed via HTTP REST using HTTP methods (e.g., GET, POST, PUT, DELETE) using following exemplary URL scheme:

```
// URL Scheme:
http(s)://<domain>:<port>/<application_path>/<rest_path>/<application_object_rest>.xsjs
```

In some implementations, metadata of an application object can be retrieved using the REST adapter 205. The metadata REST call can be mapped to the metadata access of the application object framework runtime interface. Metadata of an application object can be mapped to the following URL scheme:

```
// URL scheme:
http(s)://<domain>:<port>/<application_path>/<rest_path>/<application_object_rest>.xsjs/metadata
```

In some implementations, dynamic and/or static properties of an application object can be retrieved using the REST adapter 205. The dynamic properties of an application can be retrieved for a single instance specifying a key in the URL request before the properties URL path keyword. For multiple instances, the URL parameter key can be specified multiple times. The scope for property retrieval can be stated using action URL parameter and node URL parameter. Both parameters can be repeated multiple times. Either actions or nodes can be listed by their name and/or a reserved keyword all can be used to retrieve properties for all actions and/or for all nodes. Dynamic properties for one or multiple application object instances can be retrieved using the following exemplary URL scheme:

```
// URL scheme (single instance)
http(s)://<domain>:<port>/<application_path>/<rest_path>/<application_object_rest>.xsjs/<
vKey>/properties?(node=<nodeName|all>&action=<actionName|all>)*
```

```
// URL scheme (multiple instances)
http(s)://<domain>:<port>/<application_path>/<rest_path>/<application_object_rest>.xsjs/p
roperties?(node=<nodeName|all>&action=<actionName|all>&key=<vKey>)*
```

In some implementations, Static properties can be retrieved using staticProperties URL path keyword. The scope for property retrieval can be stated using action URL parameter and node URL parameter. Both parameters can be repeated multiple times. Nodes can be listed by their name and/or reserved keyword all can be used to retrieve static properties for all nodes. Actions can be listed (e.g., as JSON objects) using the following: {"<actionName>": {<parameters>}}. Parameters can be arbitrary objects (e.g., arbitrary JSON objects), which can be passed into the staticProperty evaluation for the corresponding action. Static properties can be retrieved for an application object using the following exemplary URL scheme:

```
// URL scheme
http(s)://<domain>:<port>/<application_path>/<rest_path>/<application_object_rest>.xsjs/st
aticProperties?(node=<nodeName|all>&action=<actionDefinition>)*
```

In some implementations, an application object definition can follow a strict schema and can be validated by the schema component 220. A validateMetadataDefinition function can return a list of error messages if there are schema violations in the provided object definition. If the object definitions are valid, the message array is empty. A schema validation can be performed using the following exemplary, non-limiting code:

```
var oDefinition = $.import("<application_object_package>",
    "<application_object_name>").definition;
var schema = $.import("sap.ino.xs.aof.core", "schema");
var aMessage = schema.validateMetadataDefinition(oDefinition);
```

In some implementations, the current subject matter can provide an application-enabled extensibility to business applications. Extensibility of business applications can provide for at least one of the following benefits: backend enhancement, enhancement to application object logic, whereby an application logic can be enhanced at specific predefined extension points, providing custom extension fields, whereby new extension fields can be defined with a specific type and/or a specific label, and/or various analytics enhancements, etc. In some implementations, all backend extensions can be based on extension packages, where an extension package can extend a base package and all objects having the same name in the extension package as in the base package can be considered to be extended. Application objects can be extended by defining an extension package and/or creating a definition in an application object library with the same name. Alternatively, custom extension fields can be defined.

An application object can be marked as extensible, which can allow for its enhancement. At runtime, a lookup can be performed for extensions for extensible application objects. The extensions can be merged to metadata being processed by the AOF system 200. For error analysis, extensions can be switched off.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 5:
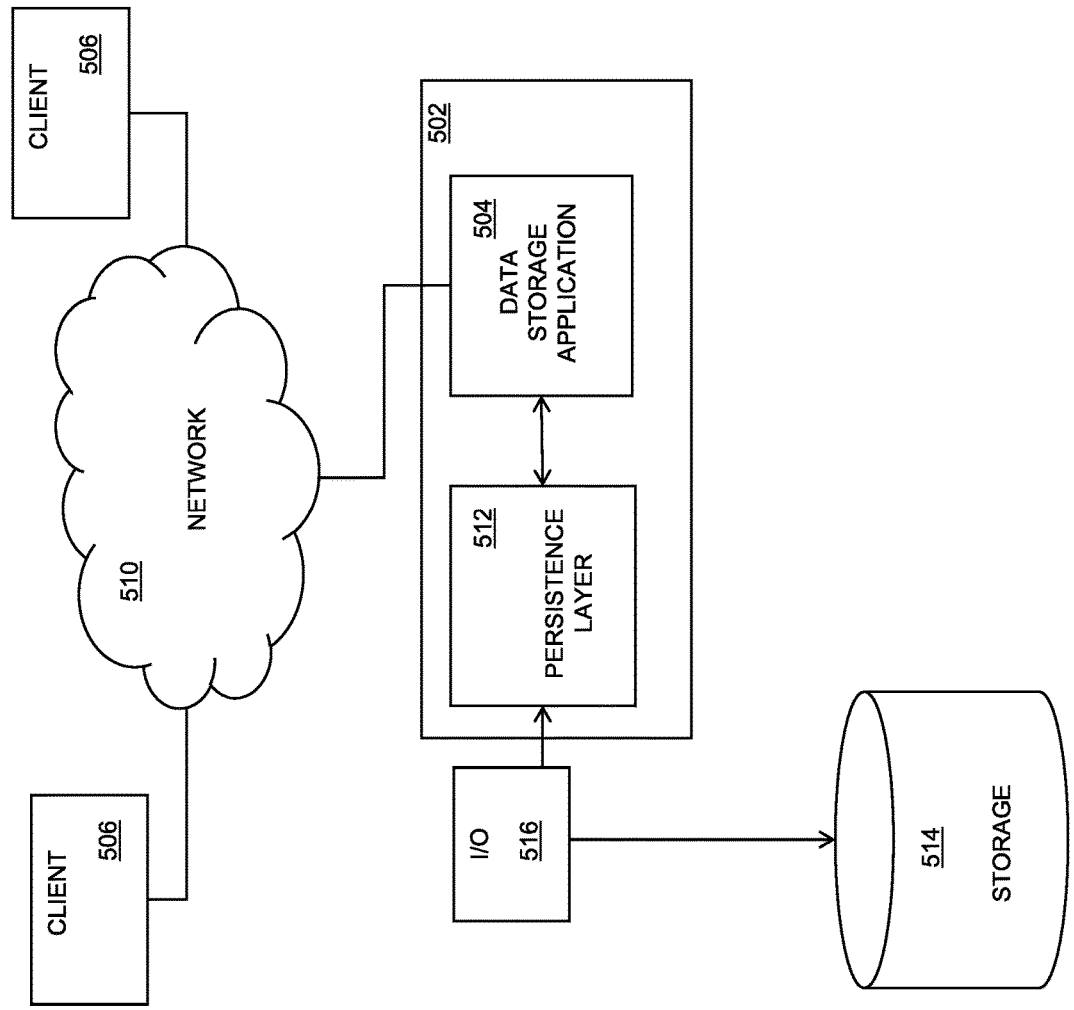
FIG. 5 is a diagram illustrating an exemplary system including a data storage application, according to some implementations of the current subject matter.

FIG. 5 illustrates an exemplary system 500 in which a computing system 502, which can include one or more programmable processors that can be collocated, linked over one or more networks, etc., executes one or more modules, software components, or the like of a data storage application 504, according to some implementations of the current subject matter. The data storage application 504 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 502 as well as to remote users accessing the computing system 502 from one or more client machines 506 over a network connection 510. One or more user interface screens produced by the one or more first modules can be displayed to a user, either via a local display or via a display associated with one of the client machines 506. Data units of the data storage application 504 can be transiently stored in a persistence layer 512 (e.g., a page buffer or other type of temporary persistency layer), which can write the data, in the form of storage pages, to one or more storages 514, for example via an input/output component 516. The one or more storages 514 can include one or more physical storage media or devices (e.g. hard disk drives, persistent flash memory, random access memory, optical media, magnetic media, and the like) configured for writing data for longer term storage. It should be noted that the storage 514 and the input/output component 516 can be included in the computing system 502 despite their being shown as external to the computing system 502 in FIG. 5.

Data retained at the longer term storage 514 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 6:
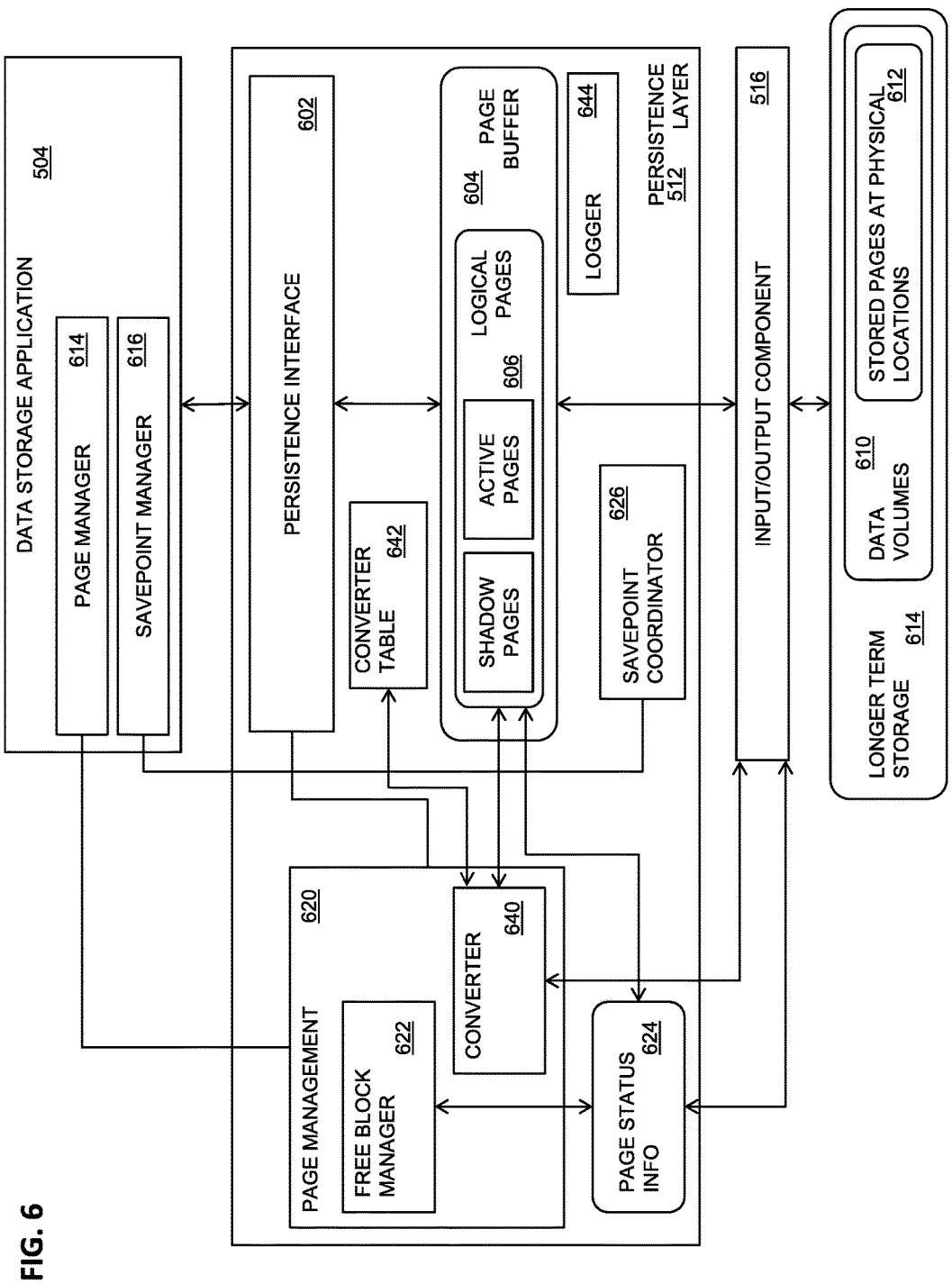
FIG. 6 is a diagram illustrating details of the system of FIG. 5.

FIG. 6 illustrates exemplary software architecture 600, according to some implementations of the current subject matter. A data storage application 504, which can be implemented in one or more of hardware and software, can include one or more of a database application, a network-attached storage system, or the like. According to at least some implementations of the current subject matter, such a data storage application 504 can include or otherwise interface with a persistence layer 512 or other type of memory buffer, for example via a persistence interface 602. A page buffer 604 within the persistence layer 512 can store one or more logical pages 606, and optionally can include shadow pages, active pages, and the like. The logical pages 606 retained in the persistence layer 512 can be written to a storage (e.g. a longer term storage, etc.) 514 via an input/output component 516, which can be a software module, a sub-system implemented in one or more of software and hardware, or the like. The storage 514 can include one or more data volumes 610 where stored pages 612 are allocated at physical memory blocks.

In some implementations, the data storage application 504 can include or be otherwise in communication with a page manager 614 and/or a savepoint manager 616. The page manager 614 can communicate with a page management module 620 at the persistence layer 512 that can include a free block manager 622 that monitors page status information 624, for example the status of physical pages within the storage 514 and logical pages in the persistence layer 512 (and optionally in the page buffer 604). The savepoint manager 616 can communicate with a savepoint coordinator 626 at the persistence layer 512 to handle savepoints, which are used to create a consistent persistent state of the database for restart after a possible crash.

In some implementations of a data storage application 504, the page management module of the persistence layer 512 can implement a shadow paging. The free block manager 622 within the page management module 620 can maintain the status of physical pages. The page buffer 604 can include a fixed page status buffer that operates as discussed herein. A converter component 640, which can be part of or in communication with the page management module 620, can be responsible for mapping between logical and physical pages written to the storage 514. The converter 640 can maintain the current mapping of logical pages to the corresponding physical pages in a converter table 642. The converter 640 can maintain a current mapping of logical pages 606 to the corresponding physical pages in one or more converter tables 642. When a logical page 606 is read from storage 514, the storage page to be loaded can be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 can ensure that changes made in the data storage application 504 are durable and that the data storage application 504 can be restored to a most recent committed state after a restart. Writing data to the storage 514 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 644 can also be included to store the changes made to the data of the data storage application in a linear log. The logger component 644 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 644 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 512 can use a combination of undo log entries (from one or more logs) and shadow paging.

The persistence interface 602 can handle read and write requests of stores (e.g., in-memory stores, etc.). The persistence interface 602 can also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 644 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 644 can write a database log (or simply referred to herein as a "log") sequentially into a memory buffer in natural order (e.g., sequential order, etc.). If several physical hard disks/storage devices are used to store log data, several log partitions can be defined. Thereafter, the logger 644 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 504 can use shadow paging so that the savepoint manager 616 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 7:
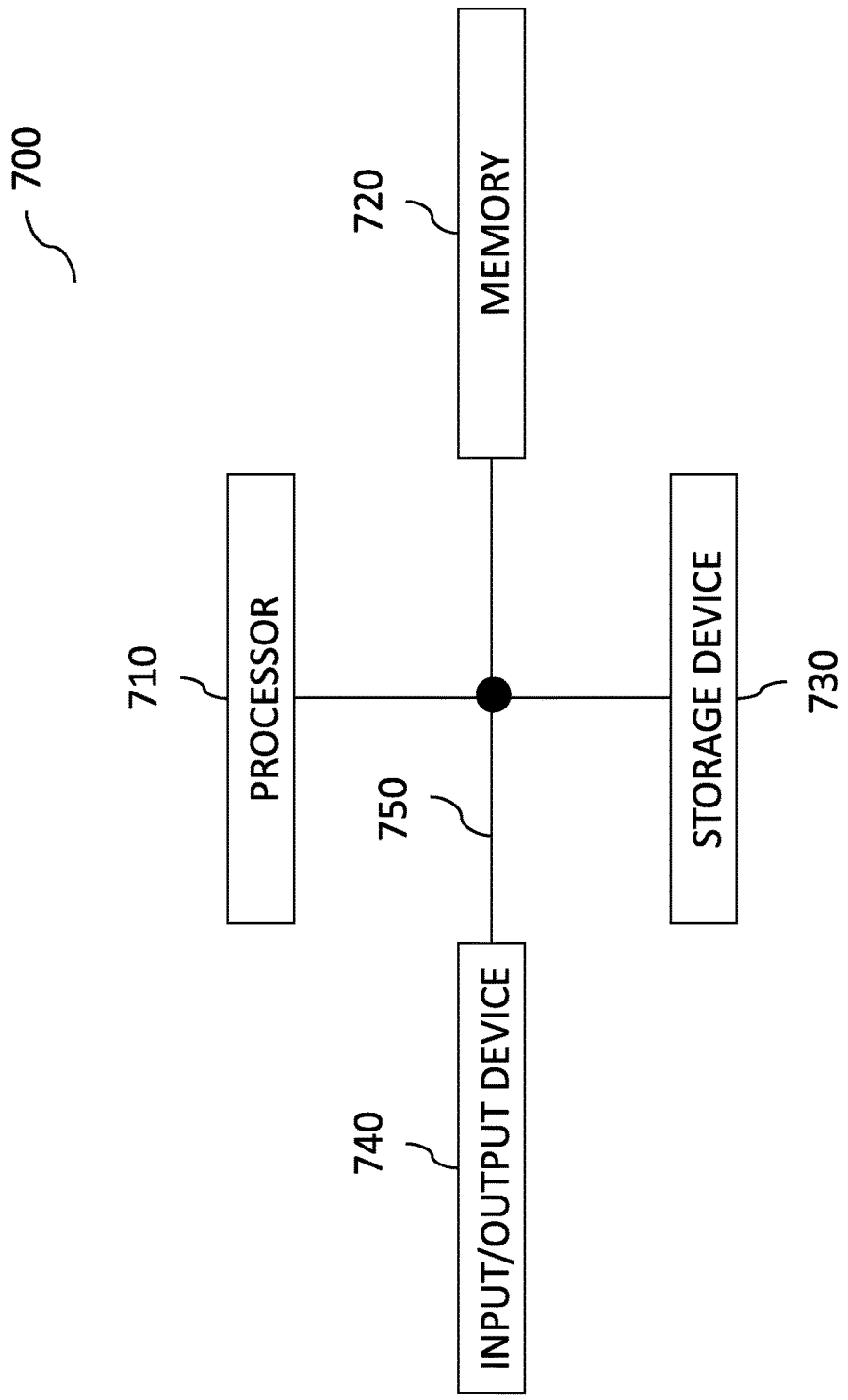
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
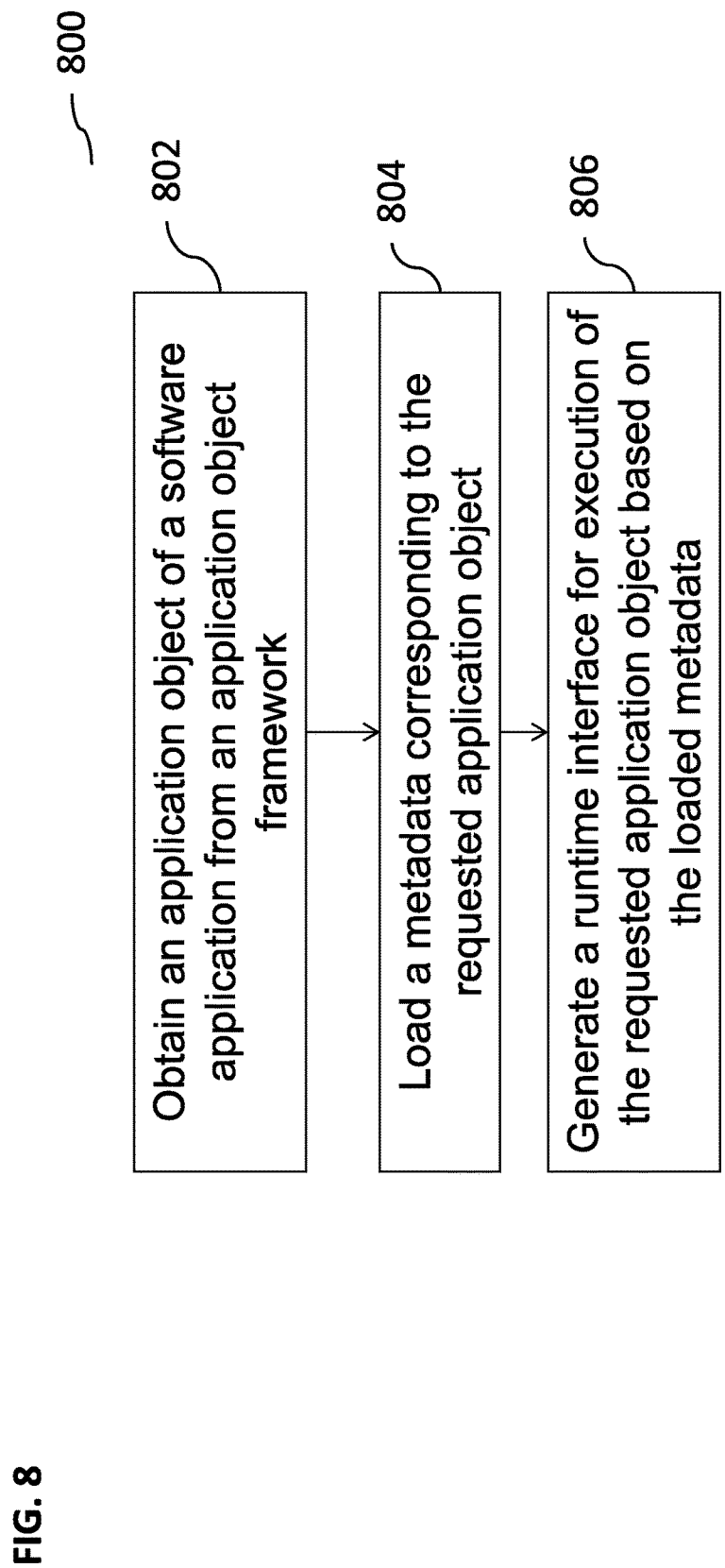
FIG. 8 illustrates an exemplary method, according to some implementations of the current subject matter.

FIG. 8 illustrates an exemplary method 800, according to some implementations of the current subject matter. At 802, in response to a request, an application object of a software application can be obtained from an application object framework (e.g., framework 200 shown in FIG. 2). At 804, the application object framework can load a metadata corresponding to the requested application object (e.g., from application object component 204 and/or metadata component 210). The metadata can contain at least one metadata schema definition. At 806, the application object framework can generate a runtime interface for execution of the requested application object based on the loaded metadata.

In some implementations, the current subject matter can include one or more of the following optional features. The application object can include at least one persistent application object and at least one operation. The operations can include at least one of the following: a create operation, a read operation, an update operation, a delete operation, a custom action operation, an existence of action check operation, and an operation on at least one property of the requested application object.

In some implementations, the method 800 can store results of the execution of the requested application object in a database communicatively coupled to the application object framework. The database can store an updated metadata for the requested application object based on the execution of the requested application object.

In some implementations, the requested application object can be characterized by at least one of the following: an object definition, a definition of an application object node, a definition of an application object root node, a definition of an application object node attribute, a definition of an application object action, and a definition of an application object authorization. The requested application object can be also characterized by at least one static property and at least one dynamic property. The request application object can further include at least one extension providing extensibility to the software application.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    obtaining, in response to a request, an application object of a software application from an application object framework;
    loading, by the application object framework, a metadata corresponding to the requested application object, the metadata containing at least one metadata schema definition, the at least one metadata schema definition including at least one determinations property specifying at least one determination executed after performing at least one application object modification;
    generating, by the application object framework, a runtime interface for execution of the requested application object based on the loaded metadata; and
    executing, based on the loading and the generating, the application object using at least one determinations property containing at least one constraint, the constraint being at least one of the following: a constraint specifying at least one determination executed after creation of the application object, a constraint specifying at least one determination executed after update of the application object, a constraint specifying at least one determination executed after modification of the application object, and any combination thereof;
    wherein at least one of the obtaining, the loading, the generating, and the executing is performed by at least one processor of at least one computing system.

2. The method according to claim 1, wherein the application object includes at least one persistent application object and at least one operation.

3. The method according to claim 2, wherein at least one operation includes at least one of the following: a create operation, a read operation, an update operation, a delete operation, a custom action operation, an existence of action check operation, and an operation on at least one property of the requested application object.

4. The method according to claim 1, further comprising storing results of the execution of the requested application object in a database communicatively coupled to the application object framework;
    wherein the database stores an updated metadata for the requested application object based on the execution of the requested application object.

5. The method according to claim 1, wherein the requested application object is characterized by at least one of the following: an object definition, a definition of an application object node, a definition of an application object root node, a definition of an application object node attribute, a definition of an application object action, and a definition of an application object authorization.

6. The method according to claim 1, wherein the requested application object is characterized by at least one static property and at least one dynamic property.

7. The method according to claim 1, wherein the request application object includes at least one extension providing extensibility to the software application.

8. A system comprising:
at least one programmable processor; and
a machine-readable medium storing instructions that, when executed by the at least one programmable processor, cause the at least one programmable processor to perform operations comprising:
obtaining, in response to a request, an application object of a software application from an application object framework;
loading, by the application object framework, a metadata corresponding to the requested application object, the metadata containing at least one metadata schema definition, the at least one metadata schema definition including at least one determinations property specifying at least one determination executed after performing at least one application object modification;
generating, by the application object framework, a runtime interface for execution of the requested application object based on the loaded metadata; and
executing, based on the loading and the generating, the application object using at least one determinations property containing at least one constraint, the constraint being at least one of the following: a constraint specifying at least one determination executed after creation of the application object, a constraint specifying at least one determination executed after update of the application object, a constraint specifying at least one determination executed after modification of the application object, and any combination thereof.

9. The system according to claim 8, wherein the application object includes at least one persistent application object and at least one operation.

10. The system according to claim 9, wherein at least one operation includes at least one of the following: a create operation, a read operation, an update operation, a delete operation, a custom action operation, an existence of action check operation, and an operation on at least one property of the requested application object.

11. The system according to claim 8, further comprising storing results of the execution of the requested application object in a database communicatively coupled to the application object framework;
wherein the database stores an updated metadata for the requested application object based on the execution of the requested application object.

12. The system according to claim 8, wherein the requested application object is characterized by at least one of the following: an object definition, a definition of an application object node, a definition of an application object root node, a definition of an application object node attribute, a definition of an application object action, and a definition of an application object authorization.

13. The system according to claim 8, wherein the requested application object is characterized by at least one static property and at least one dynamic property.

14. The system according to claim 8, wherein the request application object includes at least one extension providing extensibility to the software application.

15. A computer program product comprising a machine-readable medium storing instructions that, when executed by at least one programmable processor, cause the at least one programmable processor to perform operations comprising:
obtaining, in response to a request, an application object of a software application from an application object framework;
loading, by the application object framework, a metadata corresponding to the requested application object, the metadata containing at least one metadata schema definition, the at least one metadata schema definition including at least one determinations property specifying at least one determination executed after performing at least one application object modification;
generating, by the application object framework, a runtime interface for execution of the requested application object based on the loaded metadata; and
executing, based on the loading and the generating, the application object using at least one determinations property containing at least one constraint, the constraint being at least one of the following: a constraint specifying at least one determination executed after creation of the application object, a constraint specifying at least one determination executed after update of the application object, a constraint specifying at least one determination executed after modification of the application object, and any combination thereof.

16. The computer program product according to claim 15, wherein the application object includes at least one persistent application object and at least one operation.

17. The computer program product according to claim 16, wherein at least one operation includes at least one of the following: a create operation, a read operation, an update operation, a delete operation, a custom action operation, an existence of action check operation, and an operation on at least one property of the requested application object.

18. The computer program product according to claim 15, further comprising storing results of the execution of the requested application object in a database communicatively coupled to the application object framework;
wherein the database stores an updated metadata for the requested application object based on the execution of the requested application object.

19. The computer program product according to claim 15, wherein the requested application object is characterized by at least one of the following: an object definition, a definition of an application object node, a definition of an application object root node, a definition of an application object node attribute, a definition of an application object action, and a definition of an application object authorization.

20. The computer program product according to claim 15, wherein the requested application object is characterized by at least one static property and at least one dynamic property.

* * * * *